United States Patent [19]
Lee

[11] Patent Number: 5,311,636
[45] Date of Patent: May 17, 1994

[54] WINDSHIELD WIPER FRAME

[76] Inventor: Albert Lee, 232 Margate Rd., Timonium, Md. 21093

[21] Appl. No.: 915,750

[22] Filed: Jul. 21, 1992

Related U.S. Application Data

[63] Continuation of Ser. No. 744,418, Aug. 13, 1991, abandoned.

[51] Int. Cl.$^5$ .............................. B60S 1/38; B60S 1/04
[52] U.S. Cl. .................. 15/250.42; 15/250.20
[58] Field of Search ........... 15/250.42, 250.35, 250.41, 15/250.36, 250.20

[56] References Cited

U.S. PATENT DOCUMENTS

| | | | |
|---|---|---|---|
| Re. 24,974 | 4/1961 | Krohm | 15/250.42 |
| 2,596,063 | 5/1952 | Anderson | 15/250.42 |
| 2,782,444 | 2/1957 | Krohm | 15/250.42 |
| 3,006,018 | 10/1961 | Golub et al. | 15/250.42 |
| 3,037,233 | 6/1962 | Peres et al. | 15/250.42 |
| 3,050,765 | 8/1962 | Eichler | 15/250.42 |
| 3,296,647 | 1/1967 | Gumbleton | 15/250.04 |
| 4,354,293 | 10/1982 | LeSausse et al. | 15/250.32 |

FOREIGN PATENT DOCUMENTS

| | | | |
|---|---|---|---|
| 3532535 | 3/1987 | Fed. Rep. of Germany | 15/250.42 |
| 0518515 | 6/1987 | Fed. Rep. of Germany | 15/250.42 |
| 1173747 | 4/1960 | France | 15/250.42 |
| 1296311 | 5/1962 | France | 15/250.42 |
| 1410083 | 7/1965 | France | 15/250.42 |
| 1428310 | 1/1966 | France | 15/250.42 |
| 1520385 | 3/1968 | France | 15/250.42 |
| 2610265 | 8/1988 | France | 15/250.42 |
| 964139 | 7/1964 | United Kingdom | 15/250.42 |
| 1202649 | 8/1970 | United Kingdom | 15/250.42 |
| 3166775 | 1/1983 | United Kingdom | 15/250.42 |
| 2144927 | 5/1985 | United Kingdom | 15/250.42 |
| 8400523 | 2/1984 | World Int. Prop. O. | 19/250.42 |

Primary Examiner—Stephen F. Gerrity
Assistant Examiner—Gary K. Graham

[57] ABSTRACT

A windshield wiper frame for use in a windshield wiper assembly for motor vehicles includes a pair of primary yokes, and a bridge member pivotally connected to the pair of primary yokes and having at least one elongated vane which extends downwardly and at a slant from the front wall of the bridge member. This windshield wiper assembly can efficiently wipe the convex surface of the windshield glass and extend the operational life thereof.

19 Claims, 3 Drawing Sheets

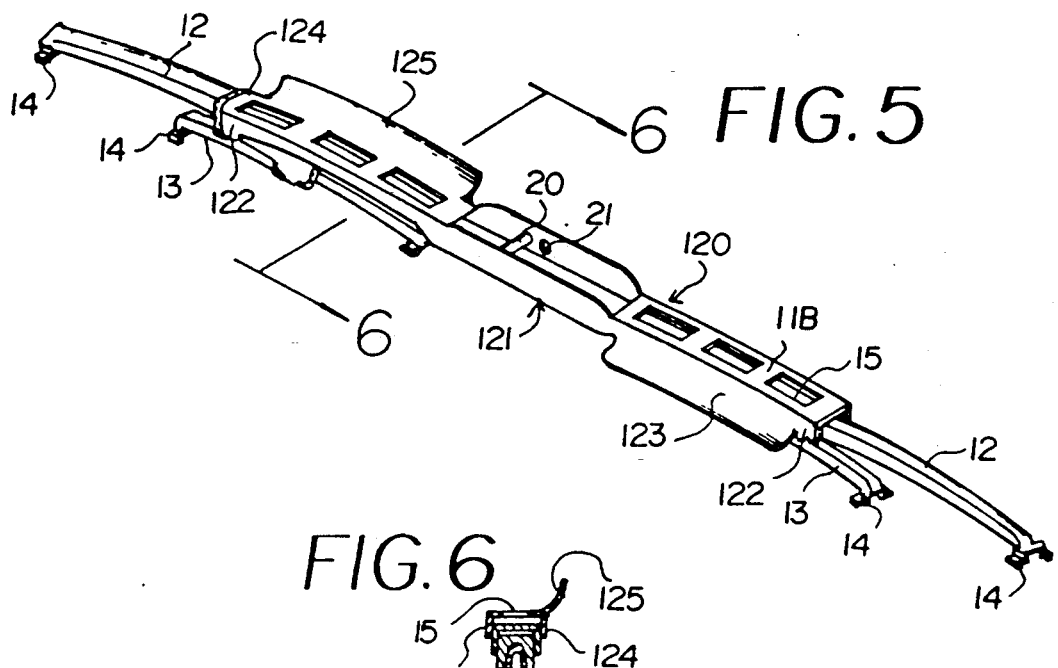
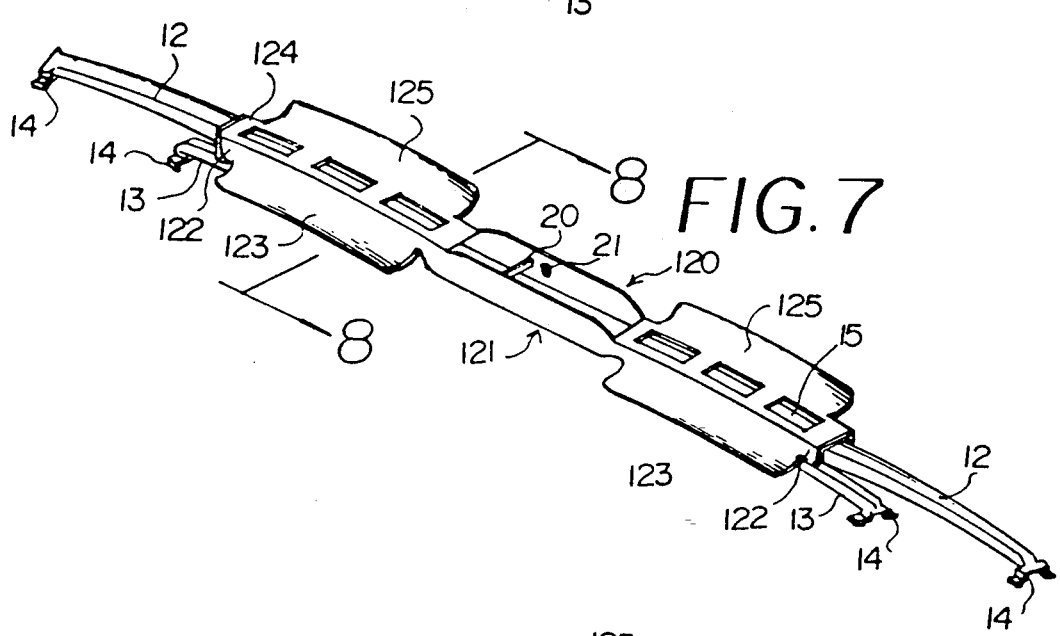
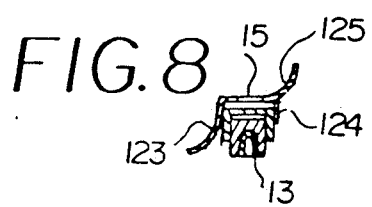

WINDSHIELD WIPER FRAME

This application is a continuation of U.S. patent application Ser. No. 07/744,418 filed on Aug. 13, 1991, now abandoned.

BACKGROUND OF THE INVENTION

1. Field of the Invention

The present invention relates generally to the construction of a windshield wiper frame and more particularly, to an improved windshield wiper frame having at least one pair of horizontally elongated vanes extending downwardly and at a slant from the rear edge of the top portion of at least one horizontally elongated opening disposed on the top of the bridge of the wiper frame. These vanes direct the flow of air through the holes in the bridge, thereby increasing air pressure on the wiper blade and improving the performance of the windshield wiper assembly.

2. Description of the Prior Art

Various types of windshield wiper frames for a windshield assembly are well known. Such windshield wiper frames include a bridge, a pair of primary yokes pivotally connected to the bridge, a pair of secondary yokes pivotally connected to one end of each primary yoke, a mounting stay mounted on the other end of each primary yoke and mounting stays mounted on each end of the secondary yokes. However, such prior art wiper frames suffer from poor cleaning performance of the windshield wiper blade due to inadequate pressure on the windshield glass.

In order to improve cleaning performance, one known windshield wiper frame as shown in FIG. 1, is equipped with a bridge having a pair of vanes extending up from the rear walls thereof. However, this wiper frame suffers from a number of problems. For example, as air flowing past the vehicle presses down on the pair of vanes, the entire upper portion of the wiper frame is also pressed down toward the glass, causing the entire frame to pivot slightly. Therefore, the lower portion of the wiper frame, and the wiper blade itself may be lifted slightly away from the glass, thereby preventing the wiper blade from effectively cleaning the convex surface of the windshield glass. This pivoting can result in decreased operational life of the wiper arm. In addition, the known bridge with vanes lacks openings disposed on the top of the bridge. These openings are needed to maintain the pressure balance on the two sides of the bendable lip of the blade so as to achieve an effective cleaning operation.

SUMMARY OF THE INVENTION

Accordingly, it is an object of the present invention to provide an improved windshield wiper frame for use in a windshield wiper assembly for motor vehicles.

Another object of the present invention is to provide an improved air flow system in a bridge member for a windshield wiper assembly.

A further object of the present invention is to provide a windshield wiper frame having a bridge member with at least one horizontally elongated vane extending downwardly and at a slant from the bottom edge of a front wall of the bridge member thereof for causing air to press down on the bride, thereby improving the wiping performance of the windshield wiper assembly and extending the operational life thereof.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a perspective view of a third embodiment of the windshield wiper frame of the present invention; and FIG. 6 is a cross-sectional view, taken along line 6—6 in FIG. 5;

FIG. 7 is a perspective view of a fourth embodiment of the windshield wiper frame of the present invention; and FIG. 8 is a cross-sectional view, taken along line 8—8 in FIG. 7.

DESCRIPTION OF THE PREFERRED EMBODIMENTS

Figure 2:
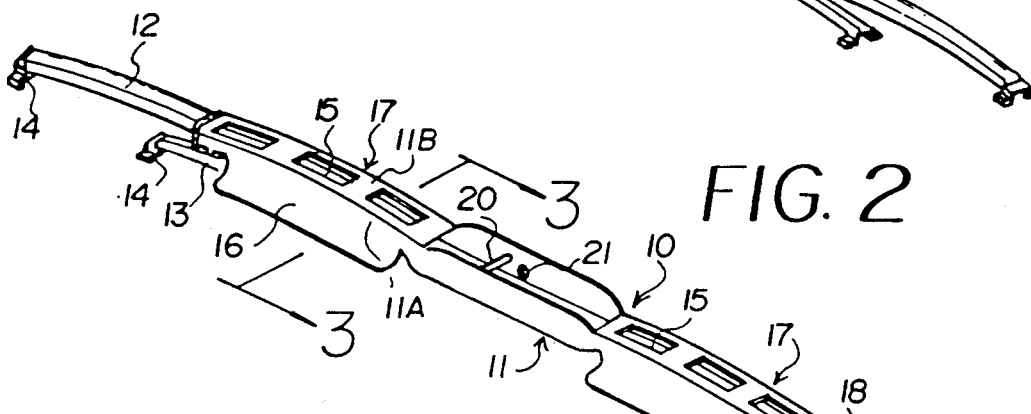
FIG. 2 is a perspective view of a first embodiment of the windshield wiper frame of the present invention.
Figure 3:
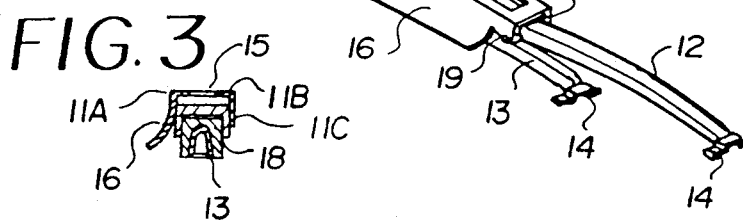
FIG. 3 is a cross-sectional view, taken along line 3—3 in FIG. 2.
Figure 9:
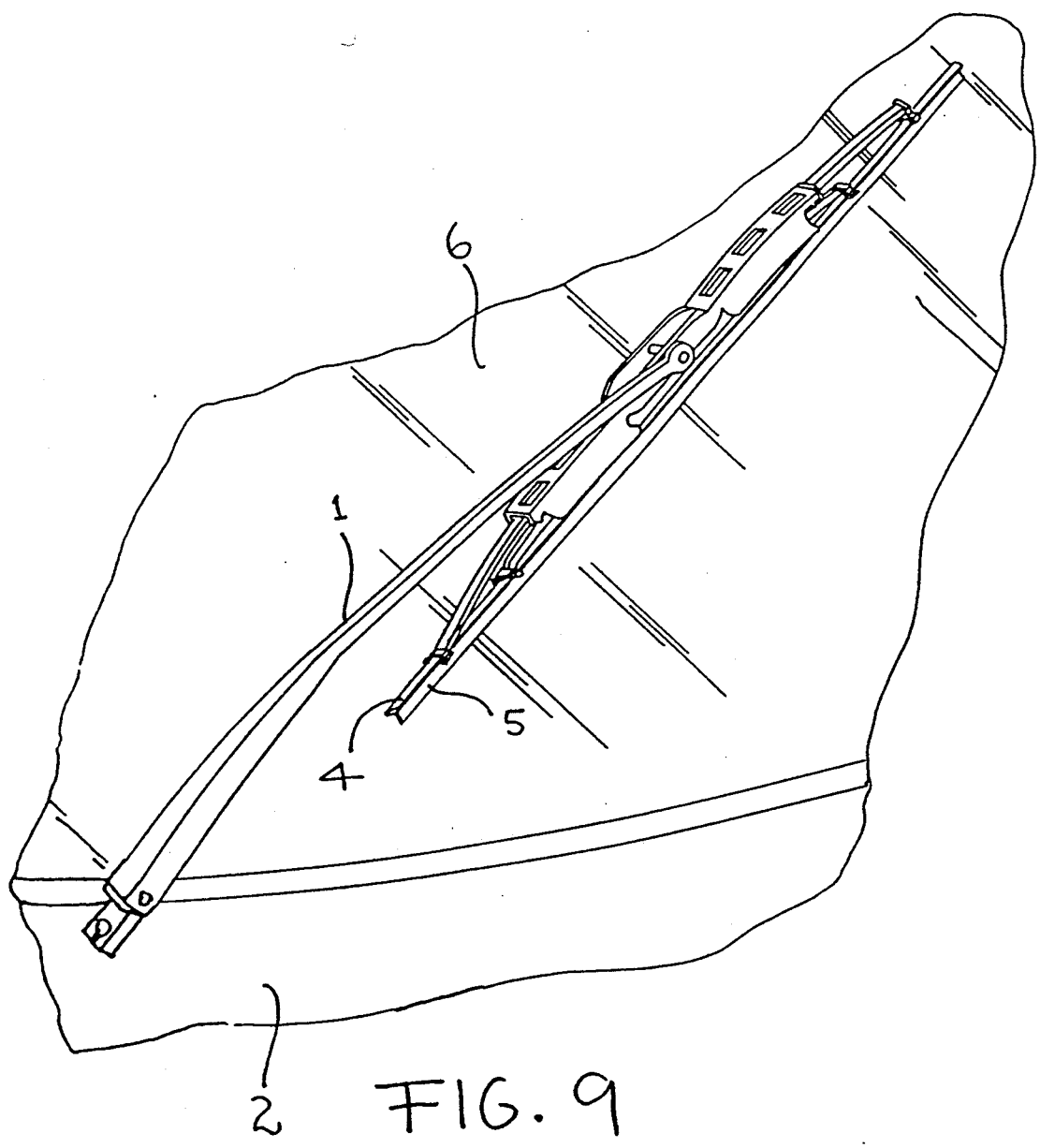
FIG. 9 is a perspective view of the embodiment of FIG. 2 installed on a vehicle windshield.

Referring now in detail to the drawings for the purpose of illustrating preferred embodiments of the present invention, the windshield wiper frame 10 for use in a windshield wiper assembly for motor vehicles as shown in FIGS. 2 and 3 and 9, comprises a wiper arm 1 attached to the body 2 of a motor vehicle, a bridge member 11, a pair of primary yokes 12 pivotally connected to the bridge member 11, and a pair of secondary yokes 13 pivotally connected to one end of the pair of primary yokes 12. Ends of the pair of secondary yokes 13 and the other end of the pair of primary yokes 12 are provided with a claw 14, respectively, for holding a flexible mounting stay 4 which carries a bendable lip 5.

As shown in FIGS. 2 and 3, the bridge member 11 defining both side portions 17 includes a front surface 11A, a top surface 11B, a rear surface 11C, and three pairs of horizontally elongated holes 15 disposed on top surface 11B of each side portion 17. Front surface 11A includes a pair of horizontally elongated vanes 16 which extend downwardly and at a slant. While the motor vehicle is running and the windshield wiper assembly is operating, the vanes 16 direct the flow of air so as to press down on the bridge and thereby improve the performance of the windshield wiper assembly. The vane-directed air stream scatters and hits the convex surface of the windshield glass 6 so that pressure exerted on the bendable 5 is maintained in a balanced state about the bendable lip 5, so as to give powerful force to the operating windshield wiper assembly so as to effectively clean and wipe the convex surface of the windshield glass 6.

The bridge member 11 further includes an engagement 18 and a clip 19 for pivotal connection to the primary yokes 13, and a shaft 20 and an aperture 19 for engaging wiper arm 1. The primary yokes 12 are connected to the secondary yokes 13 by the engagement 18 and the clip 19.

Figure 1:
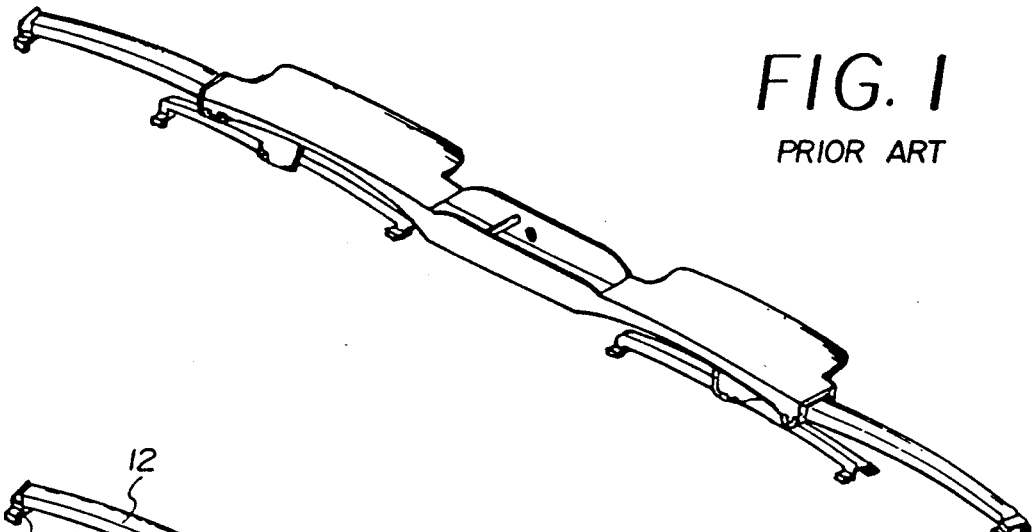
FIG. 1 shows the conventional wiper frame with vanes.
Figure 4:
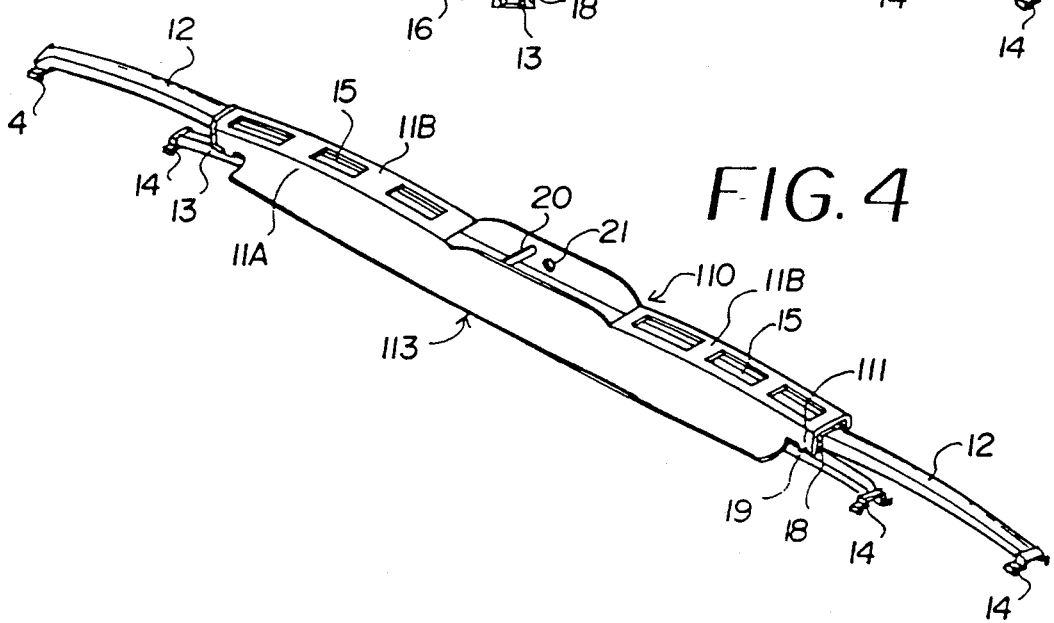
FIG. 4 is a perspective view of a second embodiment of the windshield wiper frame of the present invention.

Referring in detail to FIG. 4, there is illustrated an additional embodiment of a windshield wiper frame construction in accordance with the present invention. The windshield wiper frame 110 includes a bridge member 113 with a horizontally elongated front wall 111 disposed on the front portion of the bridge member 113. The horizontally elongated front wall 111 has a corresponding elongated vane 112 extending downwardly and at a slant from the horizontally elongated front wall III. Elongated vane 112 directs the flow of air in a similar manner as vanes 16 shown in FIGS. 1 and 2. Elongated vane 112 extends downwardly from front wall 111 along substantially the entire length of front wall 111. The other elements of the windshield wiper frame 110 are the same as the elements 12, 13, 14, 15, 18, 19, 20 and 21 of the windshield wiper frame 10.

Referring in detail to FIGS. 5 and 6, there is illustrated a further embodiment of a windshield wiper frame construction in accordance with the present invention. The windshield wiper frame 120 includes a bridge member 121 with a front wall 122 and a rear wall 124. At least one section of front wall 122, for example, the right side of front wall 122 as shown in FIG. 4 is provided with a horizontally elongated vane 123 extending downwardly and at a slant. In addition, at least one section of rear wall 124, for example, the left side of rear wall 124 as shown in FIG. 5, is provided with a horizontally elongated vane 125 extending upwardly and at a slant. Alternatively, bridge 120 can be equipped with two downwardly extending vanes 123 and two upwardly extending vanes 125 (not shown), or as shown in FIGS. 7 and 8, a downwardly extending vane 123 on the left side of front wall 122 and an upwardly extending vane 125 on the right side of rear wall 124. In each of these arrangements, the vanes 123 and 125 direct the flow of air in a similar manner as vanes 16 shown in FIGS. 1 and 2. The other elements of the windshield wiper frame 120 are the same as the elements 12, 13, 14, 15, 18, 19, 20 and 21 of the windshield wiper frame 10.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A windshield wiper assembly for a motor vehicle, which comprises:

a wiper arm attached to a body of said motor vehicle;

a windshield wiper frame comprising a bridge member attached to said wiper arm, said bridge member having a top surface, a front surface and a rear surface, said bridge member supporting a bendable lip which contacts a windshield glass of said motor vehicle, said bendable lip having two sides;

means for directing air flow to press said bridge member downwardly, said means for directing comprises at least one horizontally elongated vane extending downwardly and at a slant from said front surface of the bridge member; and at least one horizontally elongated vane extending upwardly and at a slant from said top surface of the bridge member, the at least one upwardly extending vane being smoothly joined to the top surface of the bridge member, a plurality of holes being provided on the top of the bridge member, whereby the air flow over said bridge member is directed by said vane through said holes such that a balanced pressure is maintained on the two sides of said bendable lip and a downward force is exerted on the bridge member, a constant upward slant is provided from the top surface of the bridge member to the at least one upwardly extending vane such that an area between the plurality of holes on the top surface of the bridge member and the at least one upwardly extending vane is without any depressions, the area between the plurality of holes on the top surface of the bridge member and the at least one upwardly extending vane extending horizontally for a predetermined distance such that a gradual slope to the at least one upwardly extending vane is provided.

2. The windshield wiper assembly of claim 1, wherein said at least one horizontally elongated vane extending upwardly comprises two horizontally elongated vanes which both extend upwardly.

3. The windshield wiper assembly of claim 1, wherein said horizontally elongated vane extending downwardly extends along substantially an entire length of said front surface of the bridge.

4. The windshield wiper assembly of claim 1, wherein said bridge has one of said downwardly extending horizontally elongated vanes and one of said upwardly extending horizontally elongated vanes.

5. The windshield wiper assembly of claim 1, wherein said bridge has two of said upwardly extending horizontally elongated vanes.

6. The windshield wiper assembly of claim 1, wherein the at least one horizontally elongated vane extending downwardly extends from the top of the bridge member and the plurality of holes are spaced from the downwardly extending vane such that a portion of the top of the bridge member is positioned between the holes ad the downwardly extending vane.

7. The windshield wiper assembly of claim 6, wherein the bridge member has a shaft in a central portion thereof and an aperture defined in the central portion thereof, the central portion of the bridge member with the shaft and aperture being positioned between the plurality of holes in the top surface of the bridge member, an equal number of holes being provided on each side of the central portion of the bridge member and holes on each side of the central portion of the bridge member being uniformly spaced from the central portion of the bridge member.

8. The windshield wiper assembly of claim 7, wherein the holes are generally rectangular in shape and wherein three holes are provided on each side of the central portion of the bridge member.

9. The windshield wiper assembly of claim 1, wherein said horizontally elongated vane extending downwardly extends along substantially an entire length of said front surface of the bridge member.

10. The windshield wiper assembly of claim 1, wherein the bridge member has one of said downwardly extending horizontally elongated vanes and one of said upwardly extending horizontally elongated vanes.

11. The windshield wiper assembly of claim 1, wherein the bridge member has two of said upwardly extending horizontally elongated vanes.

12. A windshield wiper assembly for a motor vehicle, which comprises:
a wiper arm attached to a body of said motor vehicle;
a windshield wiper frame comprising an elongated bridge member attached to said wiper arm, said bridge member having a flat front surface and a flat rear surface which are generally parallel to one another, and a top surface connecting said front and rear surfaces, said bridge member supporting a bendable lip which contacts a windshield glass of said motor vehicle, said bendable lip having two sides; and
means for directing air flow to press said bridge member downwardly, said means for directing comprises two horizontally elongated vanes extending downwardly and at a slant from said front surface of the bridge member, a gap being provided between the two vanes, a portion of the air flow passing through the gap, the two vanes direct another portion of the air flow over said bridge member such that a downward force is exerted on the bridge member.

13. The windshield wiper assembly of claim 12, wherein the gap is positioned at the front surface of the bridge member generally at a center thereof.

14. The windshield wiper assembly of claim 12, wherein the two vanes are generally a same size and are generally longitudinally spaced an equal distance from a center of the bridge member with the gap being at the center of the bridge member.

15. The windshield wiper assembly of claim 12, further comprising at least one horizontally elongated vane extending upwardly and at a slant from the top surface of the bridge member, the at least one upwardly extending vane being smoothly joined to the top surface of the bridge member, a constant upward slant being provided from the top surface of the bridge member to the at least one upwardly extending vane such that the top surface of the bridge member and the at least one upwardly extending vane is without depressions, a gradual slope being provided between the top surface of the bridge member and the at least one upwardly extending vane.

16. The windshield wiper assembly of claim 12, wherein a plurality of holes are defined on the top surface of the bridge member, the two vanes extending downwardly from the top of the front surface of the bridge member, the plurality of holes being spaced from the two vanes such that a portion of the top surface of the bridge member is positioned between the holes and the two vanes.

17. The windshield wiper assembly of claim 16, wherein the bridge member has a shaft in a central portion thereof and an aperture defined in the central portion thereof, the central portion of the bridge member with the shaft and aperture being positioned between the plurality of holes in the top surface of the bridge member, an equal number of holes being provided on each side of the central portion of the bridge member and holes on each side of the central portion of the bridge member being uniformly spaced from the central portion of the bridge member.

18. The windshield wiper assembly of claim 17, wherein the holes are generally rectangular in shape and wherein three holes are provided on each side of the central portion of the bridge member.

19. The windshield wiper assembly of claim 12, further comprising at least one horizontally elongated vane extending upwardly and at a slant from said top surface of the bridge member.

* * * * *